United States Patent [19]
Matsuoka

[11] Patent Number: 5,209,081
[45] Date of Patent: May 11, 1993

[54] AIR CONDITIONER FOR VEHICLE

[75] Inventor: Takayoshi Matsuoka, Yokosuka, Japan

[73] Assignee: Nissan Motor Co., Ltd., Japan

[21] Appl. No.: 878,695

[22] Filed: May 5, 1992

[30] Foreign Application Priority Data

Jun. 28, 1991 [JP] Japan .................................. 3-159008

[51] Int. Cl.$^5$ .............................................. B60H 1/32
[52] U.S. Cl. .......................................... 62/244; 62/513
[58] Field of Search ........................... 62/244, 498, 513

[56] References Cited

U.S. PATENT DOCUMENTS

| 2,079,687 | 5/1937 | Fourness ............................ | 62/513 X |
| 2,829,504 | 4/1958 | Schlichtig ........................... | 62/513 X |
| 4,696,168 | 9/1987 | Woods et al. ....................... | 62/513 X |
| 4,811,568 | 3/1989 | Horan et al. ....................... | 62/513 X |
| 5,095,712 | 3/1992 | Narreau ............................. | 62/513 X |

FOREIGN PATENT DOCUMENTS 2-56711  4/1990  Japan .

Primary Examiner—William E. Tapolcai
Attorney, Agent, or Firm—Lowe, Price, LeBlanc & Becker

[57] ABSTRACT

An air conditioner for a vehicle comprises a refrigerating cycle including a compressor, a condenser, an undercooling heat exchanger, an expansion valve, an evaporator disposed in an air duct. The air conditioner further comprises a heater core arranged at a downstream of the evaporator to pass the conditioned air therethrough, and an air-mix door for use in adjusting air flow to be passed through the heater core. The undercooling heat exchanger is disposed at the downstream of the evaporator within the air duct, and is supplied with the conditioned air when the conditioned air is sent to the heater core when the air-mix door is opened.

5 Claims, 10 Drawing Sheets

AIR CONDITIONER FOR VEHICLE

BACKGROUND OF THE INVENTION

This invention relates to an air conditioner for a vehicle, and in particular, to an air conditioner of this type which serves high cooling capacity of an evaporator with a lower fuel consumption even, for example, on an idle running of an engine.

As well known in the art, an air conditioner for a vehicle generally comprises refrigerating cycle including at least a compressor, a condenser, an expansion valve, and an evaporator. The compressor compresses gasified refrigerant into compressed refrigerant. The condenser condenses the compressed refrigerant into liquid refrigerant. The liquid refrigerant is then supplied to the expansion valve. The expansion valve expands the liquid refrigerant into sprayed refrigerant. The sprayed refrigerant is evaporated in the evaporator. In some cases, the refrigerating cycle also includes a receiver and an undercooling heat exchanger. Such an air conditioner is disclosed in a Japanese Unexamined Utility Model Prepublication No. Jikkai-hei 2-56711. The air conditioner comprises the heat exchanger between the receiver and the evaporator in the refrigerating cycle. The heat exchanger is disposed at the front end of a car body so as to improve the cooling capacity of the evaporator by increasing a degree of undercooling of the liquid refrigerant, utilizing ventilation through a damper or blast from an electric fan.

In the conventional air conditioner, the degree of undercooling is relatively low when the undercooling is carried out, on the idle running of the engine or on a traffic jam, by using the blast from the electric fan. More specifically, the electric fan is supplied with the hot air affected by heat irradiation from an engine so that the cooling capacity of the evaporator is less improved. In addition, it is necessary to increase engine speed for properly operating the electric fan.

SUMMARY OF THE INVENTION

Accordingly, it is an object of this invention to provide an air conditioner for a vehicle which can increase efficiency of cooling.

It is another object of this invention to provide an air conditioner having a refrigerating cycle which is not affected by high atmospheric temperature in summer or a heat radiation from an engine.

It is yet another object of the present invention to provide an air conditioner having a refrigerating cycle in which refrigerant flow into an expansion valve is not interrupted by a refrigerant steam.

With those and other objects in view, an air conditioner for a vehicle according to a first aspect of this invention comprises a refrigerating cycle consisting of a compressor for compressing a gasified refrigerant into a compressed refrigerant, a condensor for condensing said compressed refrigerant into a liquid refrigerant, an undercooling heat exchanger for undercooling said liquid refrigerant into a cold liquid refrigerant, an expansion means for expanding said cold liquid refrigerant into an expanded refrigerant, an evaporator for evaporating said expanded refrigerant, said evaporator being disposed in an air duct, a heating means for heating a conditioned air, said heating means is arranged at a downstream of said evaporator to pass said conditioned air therethrough, and an air-mix door for use in adjusting air flow to be passed through said heating means, wherein said undercooling heat exchanger is disposed at the downstream of said evaporator within said air duct, and is supplied with said conditioned air when said conditioned air is send to said heating means when said air-mix door is opened.

An air conditioner for a vehicle according to the first aspect of the present invention, said air conditioner further comprises a calculating means for calculating a degree of undercooling of said refrigerating cycle in accordance with refrigerant temperature in said condensor and with that at an inlet of said expansion means, and an open/close control means for controlling cold air flow send to said undercooling heat exchanger in accordance with said calculated degree of undercooling and said temperature at said inlet of said expansion means or atmospheric temperature.

An air conditioner for a vehicle according to the first aspect of the present invention, said undercooling heat exchanger is supplied with cold air from said evaporator by opening said open/close control means when said air-mix door is opened.

DETAILED DESCRIPTION OF THE PREFERRED EMBODIMENTS

Figure 1:
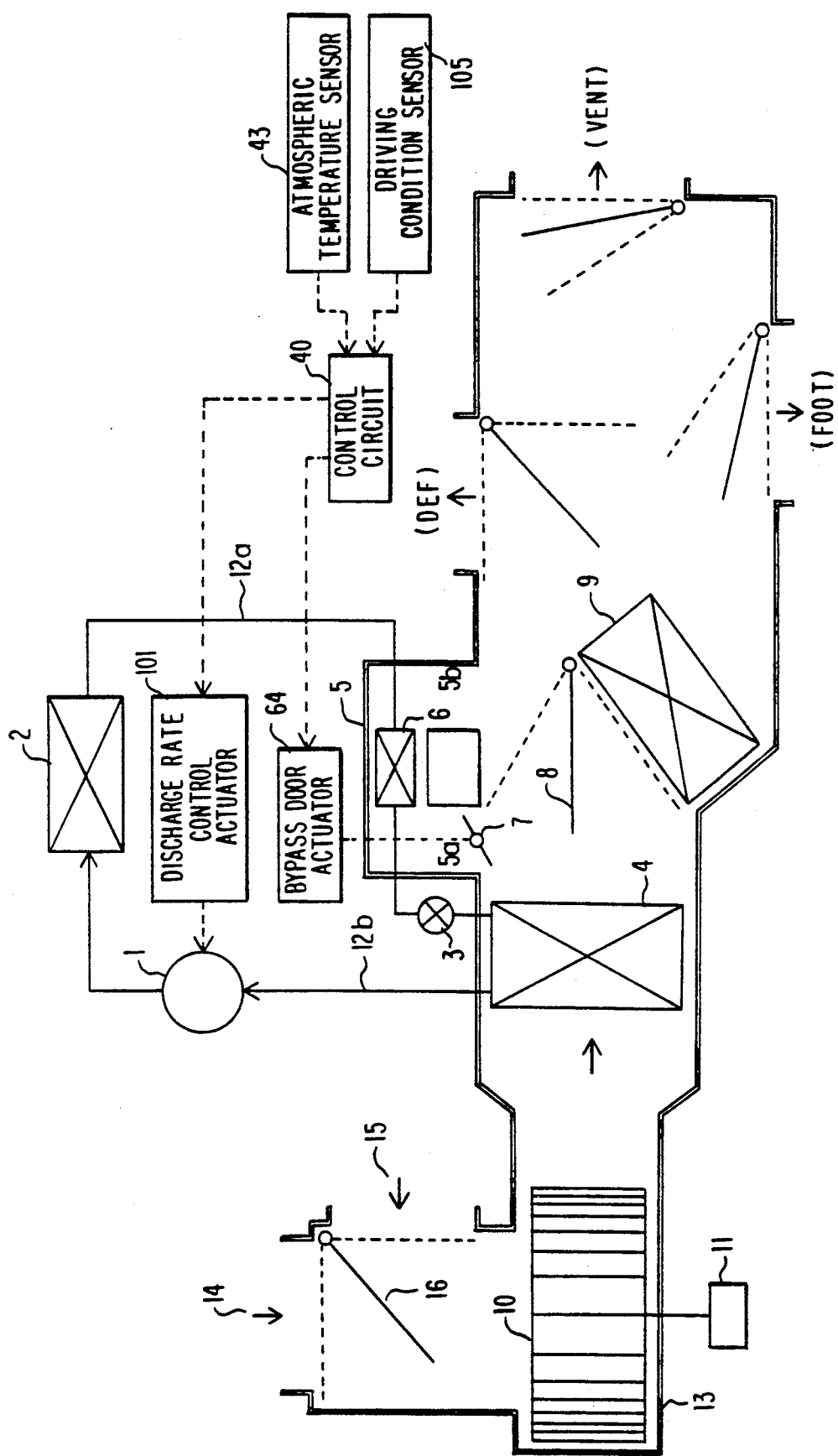
FIG. 1 shows a block diagram of an air conditioning system according to the present invention.

Referring now to drawings, FIG. 1 shows a block diagram of an air conditioning system according to the present invention. In FIG. 1, a compression refrigerating cycle consists of a variable displacement compressor 1, a condenser 2, an expansion valve 3, an evaporator 4, and a heat exchanger 6. The compressor 1 is a swash plate compressor and is driven by an engine (not shown). These components are connected with each other via a high-pressure pipeline 12a and a low-pressure pipeline 12b. The variable displacement compressor 1 is controlled by a discharge rate control actuator 101. The discharge rate can be increased by enlarging the lean angle of a swash plate when inlet pressure Ps becomes larger than predetermined pressure Pr. The predetermined pressure Pr is adjusted by energizing a solenoid (not shown) in a control circuit 40. The control circuit 40 comprises a microcomputer (not shown).

In a ventilation flue of an air duct 13, disposed are a blower fan 10, the evaporator 4, an air-mix door 8 and a heater core 9. The heater core 9 serves as a heating arrangement. The blower fan 10 is driven by a blower fan motor 11.

A bypass ventilation flue 5 is formed at the downstream of the evaporator 4 in the air duct 13. The bypass ventilation flue 5 is supplied with cold air from the evaporator 4. In the bypass ventilation flue 5, the undercooling heat exchanger 6 is disposed. The undercooling heat exchanger 6 enables to cool the refrigerant which is condensed in the condenser 2. An inlet port 5a of the bypass ventilation flue 5 is formed between the downstream of the evaporator 4 and the upstream of the air-mix door 8. A bypass door 7 which serves as an opening member is disposed at the inlet port 5a. The bypass door 7 is operated by a bypass door actuator 64 consisting of a drive motor or the like. The control circuit 40 and the bypass door actuator 64 act as a drive control arrangement. Accordingly, the degree of undercooling of the refrigerating cycle can be controlled by operating the bypass door 7 and by adjusting air flow to be sent to the bypass ventilation flue 5.

The air duct 13 has a plurality of inlet and outlet for ventilation of the air. For example, fresh air is delivered through a fresh air inlet 14 and the recycled room air flows into the air duct 13 through a recycle air inlet 15. The air flow supplied from the fresh air inlet 14 and the recycled air inlet 15 is adjusted by using an intake door 16. After air conditioning is carried out in a manner described hereinafter, the air is sent to a car room through, for example, a defroster (DEF) and a ventilator (VENT).

The control circuit 40 for controlling the bypass door actuator 64 is connected to an atmospheric temperature sensor 43 and a driving condition sensor 105. The driving condition sensor detects, for example, a rotation speed of the engine. The opening/closing operation of the bypass door 7 is carried out in response to detection signals supplied from these sensors.

Figure 2:
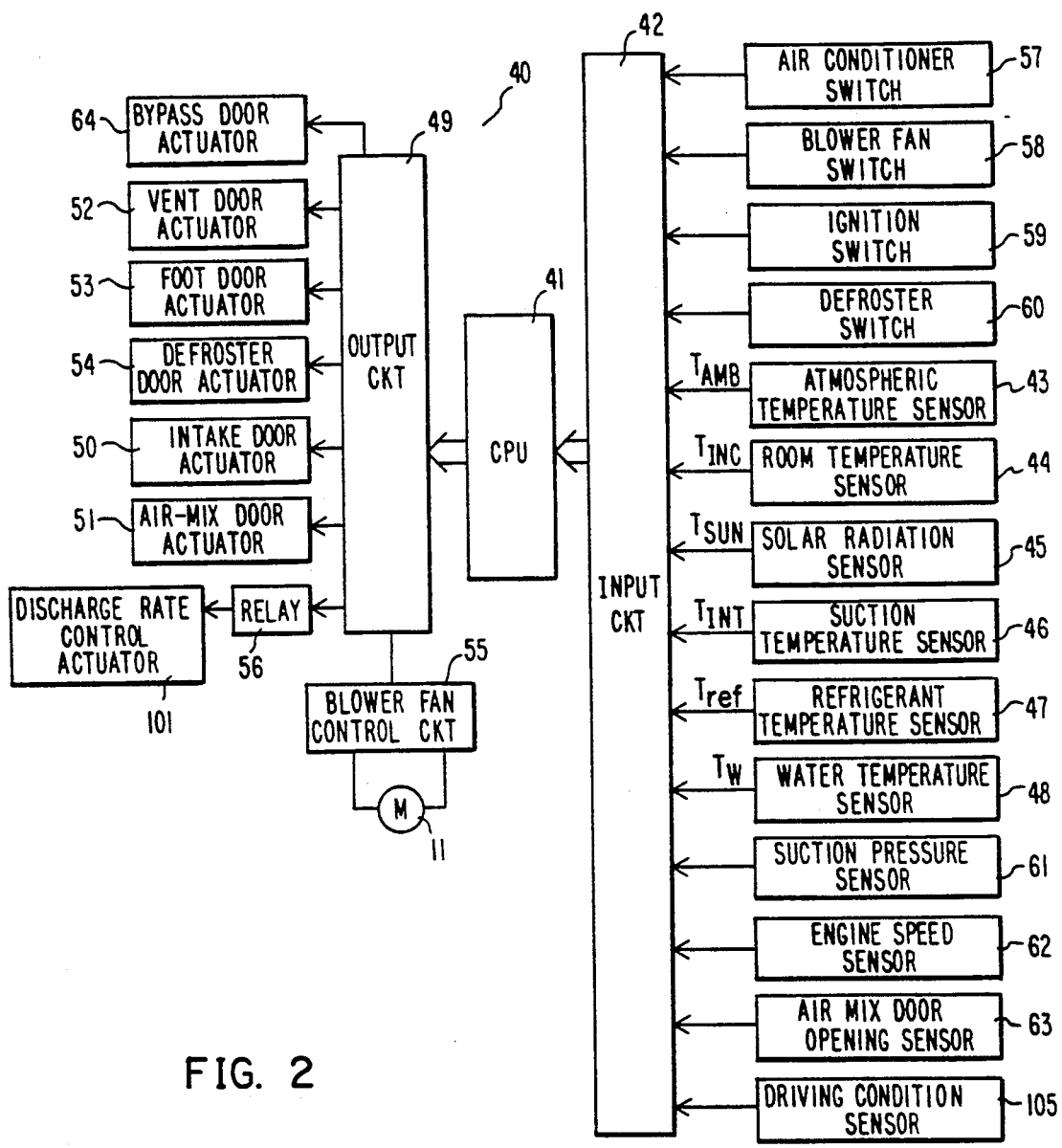
FIG. 2 shows a block diagram of a control circuit illustrated in FIG. 1.

Referring to FIG. 2, the control circuit 40 in the air conditioner is illustrated with sensors and switches. A central processing unit (CPU) 41 is connected to, via an input circuit 42, the atmospheric temperature sensor 43, a room temperature sensor 44, a solar radiation sensor 45, a suction temperature sensor 46, a refrigerant temperature sensor 47, a water temperature sensor 48, and the driving condition sensor 105. The atmospheric temperature sensor 43 detects atmospheric temperature $T_{AMB}$. The room temperature sensor 44 detects car room temperature $T_{INC}$. The solar radiation sensor 45 detects a value of solar radiation $Q_{SUN}$. The suction temperature sensor 46 detects air temperature at the downstream of the evaporator 4 (hereinafter referred as suction temperature) $T_{INT}$. The refrigerant temperature sensor 47 is arranged at an outlet wall of the expansion valve 3 and detects refrigerant temperature $T_{ref}$. The water temperature sensor 48 detects cooling water temperature $T_W$. Sensed data are supplied from each sensor to the input circuit 42. The input circuit 42 comprises an analog/digital converter for use in converting each sensed data of an analog signal into a digital signal. The converted digital signal indicative of each data is supplied to the CPU 41. The input circuit 42 is further connected to an air conditioning switch 57, a blower fan switch 58, an ignition switch 59, a defroster switch 60, a suction pressure sensor 61, an engine speed sensor 62, and an air-mix door opening sensor 63. The suction pressure sensor 61 detects suction pressure in an intake manifold (not shown). The engine speed sensor 62 detects engine speed and the air-mix door opening sensor 63 detects opening of the air-mix door 8.

The CPU 41 is connected, via an output circuit 49, to an intake door actuator 50, an air-mix door actuator 51, a vent door actuator 52, a foot door actuator 53, a defroster door actuator 54, the bypass door actuator 64 and the blower fan control circuit 55. The blower fan control circuit 55 is connected to a blower fan motor 11. The output circuit 49 is connected, via a relay 56, to a solenoid unit of the discharge rate control actuator 101. The output circuit 49 comprises a digital/analog converter for use in converting each digital signal into an analog signal. The CPU 41 controls and operates each actuator in response to the sensed data supplied from each sensor and each switch in order to properly adjust the predetermined pressure Pr in the variable displacement compressor 1 and temperatures at various location. In addition, the CPU 41 controls the blower fan motor 11 through the blower fan control circuit 55 in response to an air flow control signal so as to obtain a proper air flow in the blower fan 10.

Figure 3:
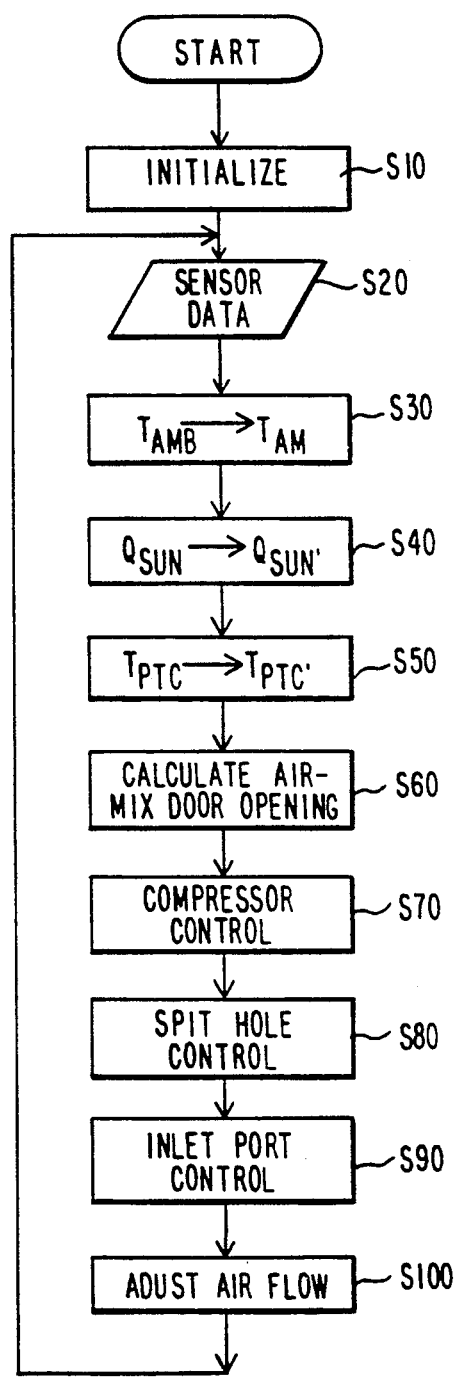
FIG. 3 is a flow chart of a main control routine according to the present invention.

FIG. 3 shows a flow chart of a main control routine for an air conditioner carried out by the CPU 41.

At step S10, initialization operation is carried out. In a normal automatic air conditioning mode, a set temperature $T_{PTC}$ is initialized into 25° C. At step S20, the CPU 41 is supplied with detected data from each sensor.

Step S30 processes the atmospheric temperature $T_{AMB}$ supplied from the atmospheric temperature sensor 43 into a real atmospheric temperature $T_{AM}$. The sensed temperature $T_{AMB}$ is affected by heat radiation from other heat sources. Accordingly, the CPU 41 calculates, at the step S30, the real atmospheric temperature $T_{AM}$ in consideration of the radiation heat. Following step S40 converts luminous energy indicative of the value of solar radiation into quantity of heat. In other words, the sensed data supplied from the solar radiation sensor 45 is processed into the value $Q_{SUN}'$ representing the quantity of heat. At step S50, the set temperature $T_{PTC}$ which is set by using a control panel (not shown) is corrected, in consideration of the atmospheric temperature, into a corrected set temperature $T_{PTC}'$. Step S60 calculates a desired blowing temperature $T_0'$ considering the corrected set temperature $T_{PTC}'$, the car room temperature $T_{INC}$, the real atmospheric temperature $T_{AM}$, and the corrected value of solar radiation $Q_{SUN}'$. In addition, the opening of the air-mix door is calculated at the step S60 in accordance with a deviation between the desired blowing temperature $T_0$ and real blowing temperature. In this event, the opening of the air-mix door should be calculated in consideration with a heat exchange rate in the undercooling heat exchanger 6. At step S70, the variable displacement compressor 1 is controlled in a manner described below. At step S80, each spit hole is controlled. Step S90 controls the inlet ports 14 and 15. More particularly, the CPU 41 adjusts air flow at the fresh air inlet 14 and the recycled air inlet 15 by controlling the opening of the intake door 16. At step S100, air flow send through each spit hole into the car room is adjusted by controlling the blower fan 10.

Figure 4:
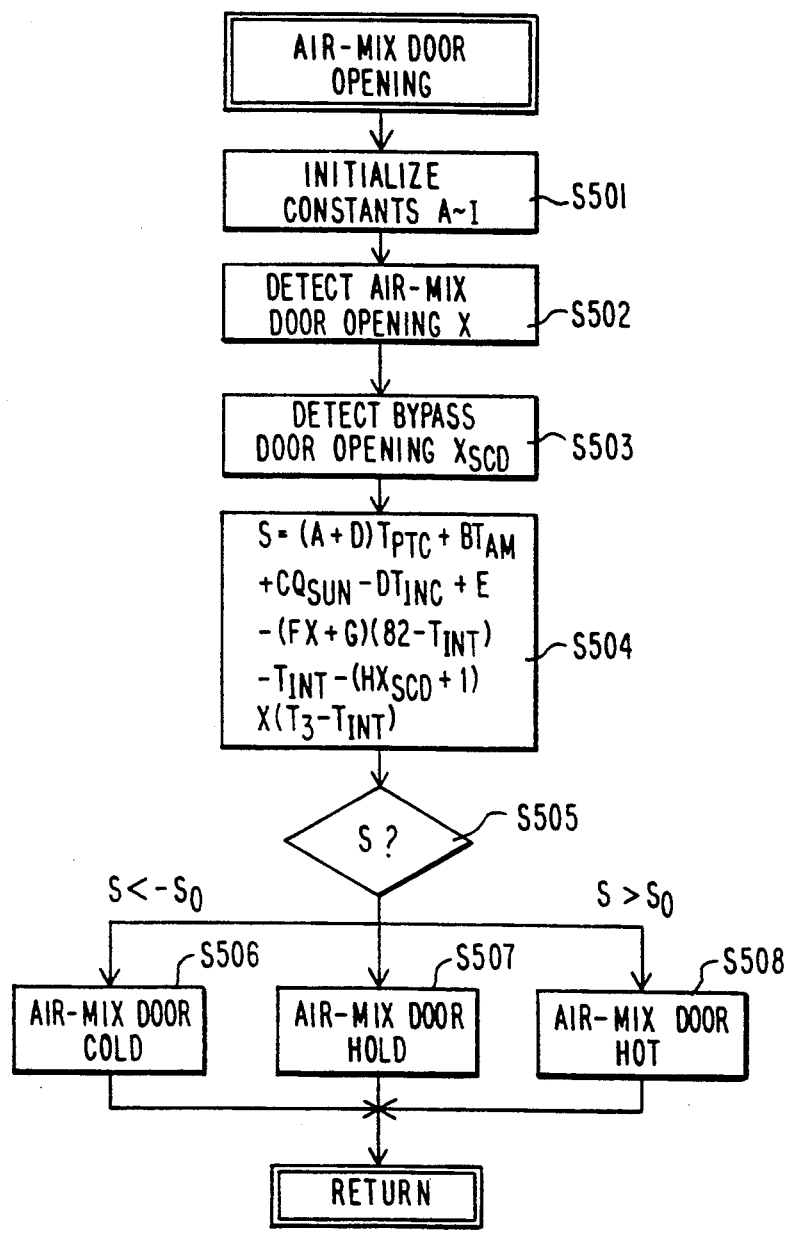
FIG. 4 is a flow chart of an air-mix door opening calculating routine.

FIG. 4 shows a flow chart of an air-mix door opening calculation routine.

At step S501, constants A to G and H and I are initialized. At step S502, an air-mix door opening X is detected by using the air-mix door opening sensor 63. At step S503, an opening $X_{SCD}$ of the bypass door 7 is detected, which is disposed at the entrance of the bypass ventilation flue 5. Step S504 calculates a deviation S between the desired blowing temperature $T_0$ and the real blowing temperature according to a following equation:

$$S = ((A + D) \times T_{PTC'}) + (B \times T_{AM}) + (C \times Q_{SUN'}) -$$
$$(D \times T_{INC}) + E - ((F \times X + G) \times (82 - T_{INT})) -$$
$$T_{INT} - ((H \times X_{SCD} + 1) \times (T_3 - T_{INT}))$$

where $T_3$ represents temperature of the refrigerant flowing into the undercooling heat exchanger 6.

At step S505, the calculated deviation S is compared with a predetermined deviation $S_0$. When calculated deviation S is less than the predetermined deviation $-S_0$, namely:

$$S < -S_0,$$

then step S506 proceeds. At the step S506, the air-mix door 8 is in a position represented by "COLD" so as to reduce the air flow to be passed through the heater core 9. When the calculated deviation S is larger than a sign-inverted predetermined deviation $S_0$, namely, $$S > S_0,$$

a step S508 is succeeded. At the step S508, the air-mix door 8 is in a position represented by "HOT" so as to increase the air flow to be passed through the heater core 9. In addition, when an absolute value of the calculated deviation S is less than or equal to the predetermined deviation $S_0$, namely, $$|S| \leq S_0,$$

the current opening will be held.

Referring to FIGS. 5 through 8, detailed description will be made as regards the operation carried out at the step S70 illustrated in FIG. 3.

Figure 5:
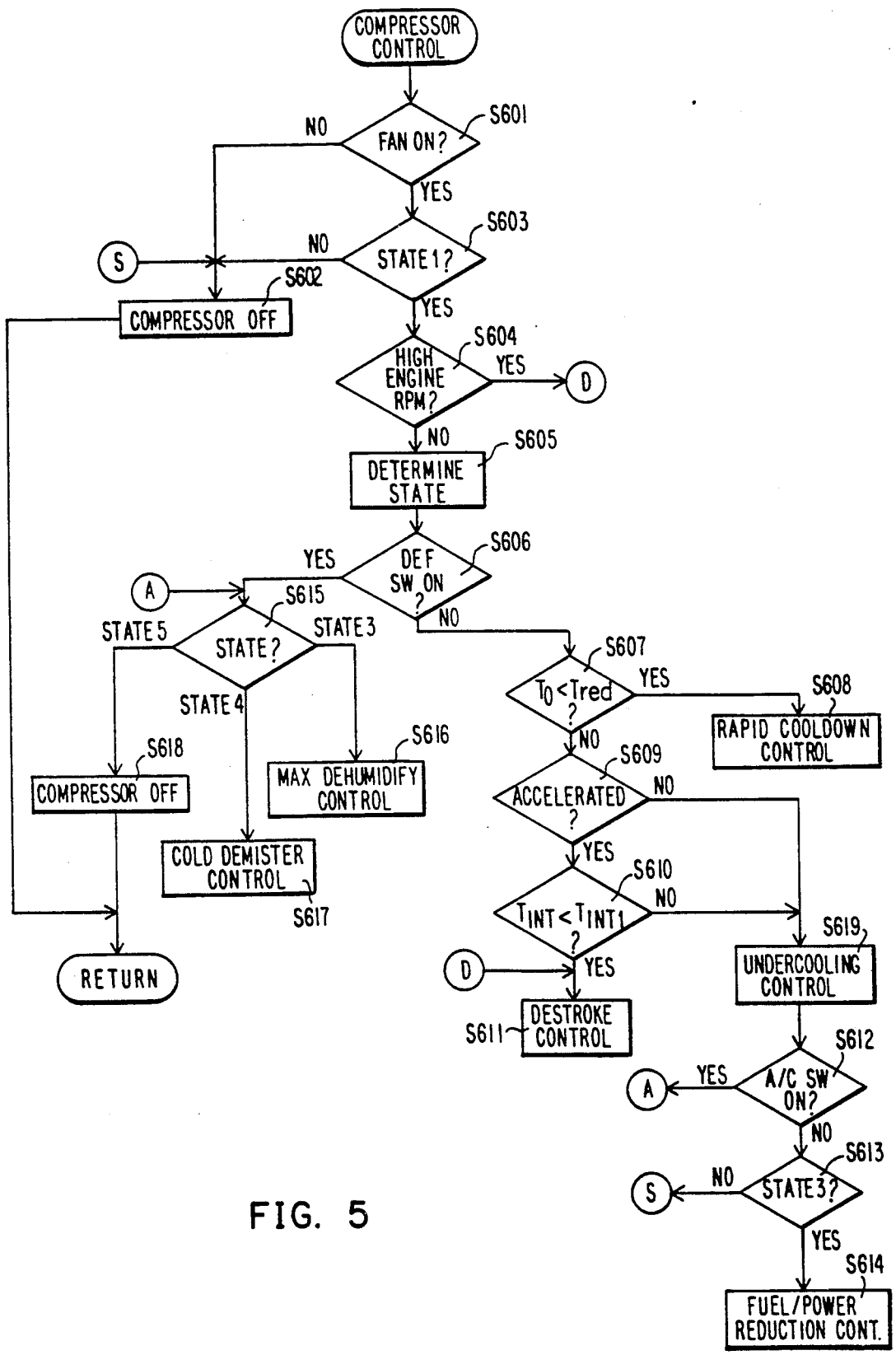
FIG. 5 is a flow chart of a compressor controlling routine.
Figure 6:
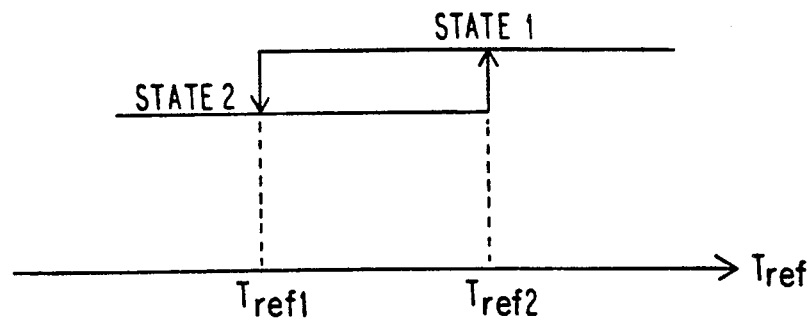
FIG. 6 is a view for use in describing two states of the refrigerant temperature.

In FIG. 5, step S601 determines whether or not the blower fan motor 11 is operated (ON state), according to a signal supplied from the blower fan switch 58. When not operated, the variable displacement compressor 1 is stopped at step S602. When operated, the CPU 41 determines, at step S603, whether the current refrigerant temperature is in a state 1 or in a state 2 according to the detected refrigerant temperature $T_{ref}$. Subsequently, the determined state is stored in a predetermined memory area (not shown). It is noted that, in FIG. 6, $T_{ref1}$ is the refrigerant temperature when a heat load is small and $T_{ref2}$ is the refrigerant temperature when a heat load is larger than that of $T_{ref1}$ to a certain degree. In addition, $T_{ref1}$ is lower than a reference refrigerant temperature $T_{ref}$ determined in accordance with the atmospheric temperature $T_{AM}$ in a well known cold demister control. When the current state is in the state 2, then the variable displacement compressor 1 is stopped at the step S602.

As mentioned above, the variable displacement compressor 1 is completely stopped under the condition with a small amount of refrigerant. The heat load to the evaporator 4 induced by the air passing through the evaporator 4 is significantly small when the refrigerant flow is rather small due to, for example, the cold demister control in a predetermined cold atmospheric temperature area. Under the circumstances, the variable displacement compressor 1 is badly effected because of unstable refrigerant condition in the evaporator 4. Accordingly, the CPU 41 makes the variable displacement compressor 1 stop when the refrigerant temperature is less than a predetermined value.

Figure 7:
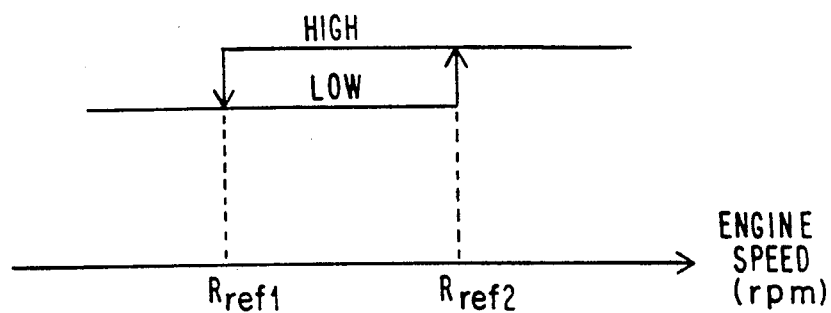
FIG. 7 is a view for use in describing two states of the engine speed.
Figure 8:
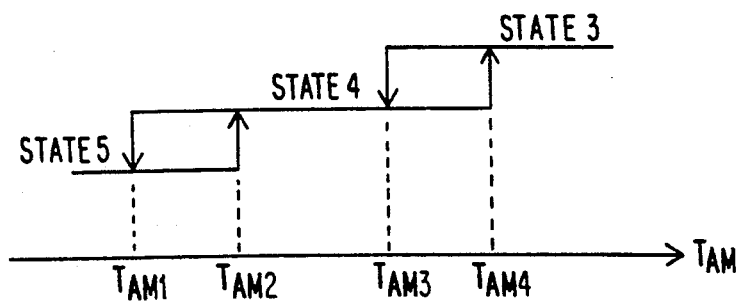
FIG. 8 is a view for use in describing three states of the atmospheric temperature.

On the contrary, when the current state is in the state 1 at the step S603, step S604 is succeeded. At the step S604, the engine speed is determined in accordance with a signal supplied from the engine speed sensor 62. When the engine speed is relatively low, step S605 is succeeded. More specifically, when the increasing engine speed is smaller than a predetermined speed $R_{ref2}$ as shown in FIG. 7, the step S605 is carried out. On the other hand, when the engine speed is relatively high, namely, the decreasing engine speed is larger than a predetermined speed $R_{ref1}$ illustrated in FIG. 7, step S611 follows in order to carry out a destroke control. At step S605, the CPU 41 determines in which state among state 3 through 5 the corrected atmospheric temperature $T_{AM}$ is classified based on a map illustrated in FIG. 8. In this event, $T_{AM1}$ and $T_{AM2}$ are states where the atmospheric temperature is significantly low while $T_{AM3}$ and $T_{AM4}$ are states where the atmospheric temperature is high to some degree. After determination of the state, the determined state is stored in a predetermined memory area. Then the step S605 is followed by step S606.

At the step S606, the CPU 41 determines whether or not the defroster switch 60 is turned on. When the step S606 is negative, the CPU 41 determines, at step S607, whether or not the desired blowing temperature $T_0$ calculated at the step S60 is less than temperature $T_{rcd}$, where $T_{rcd}$ represents a temperature obtained without the air passed through the heater core 9. In other words, $T_{rcd}$ is obtained under the circumstances that the air-mix door 8 is extremely closed and no air is supplied into the heater core 9. When the desired blowing temperature $T_0$ is less than $T_{rcd}$, namely, $$T_0 < T_{rcd},$$

step S608 is succeeded in order to carry out rapid cooling down control. It is noted that the step S607 is carried out one time only when the ignition switch 59 is turned on or when the blower fan switch 58 is turned on.

When the step S607 is negative, step S609 determines whether or not a vehicle is accelerated in accordance with the inlet pressure of an intake manifold detected by the inlet pressure sensor 61. When the step S609 is affirmative, determination will be made at step S610 as to whether or not the inlet temperature $T_{INT}$ is less than $T_{INT1}$, namely.

$$T_{INT} < T_{INT1}.$$

When the step S610 is positive, the destroke control is carried out at step S611. On the other hand, when either one of the step S609 and the step S610 is negative, undercooling control is carried out at step S619.

The step S619 is followed by step S612 in order to determined whether or not the switch of the air conditioner is turned on. When the step S612 is affirmative, then step S615 is succeeded. On the contrary, the step S612 is followed by step S613 when the air conditioning switch is not turned on. At the step S613, the atmospheric temperature $T_{AM}$ is detected and the CPU 41 determines in which state among above-mentioned state 3 through 5 the atmospheric temperature is classified. When the atmospheric temperature $T_{AM}$ is classified in the state 3, step S614 proceeds in order to reduce fuel consumption and driving force. When the step S613 is negative, the variable displacement compressor 1 is stopped at the step S602.

When the step S606 is positive due to ON state of the defroster switch 60, step S615 proceeds in order to determine which state is stored in the predetermined memory area at the step S605. When the stored data represents the state 3, MAX dehumidify control is carried out at step S616. Under the state 4, step S617 proceeds after the step S615 for carrying out the cold demister control. The step S615 is followed by step S618 to stop the variable displacement compressor 1 under the state 5.

Figure 9:
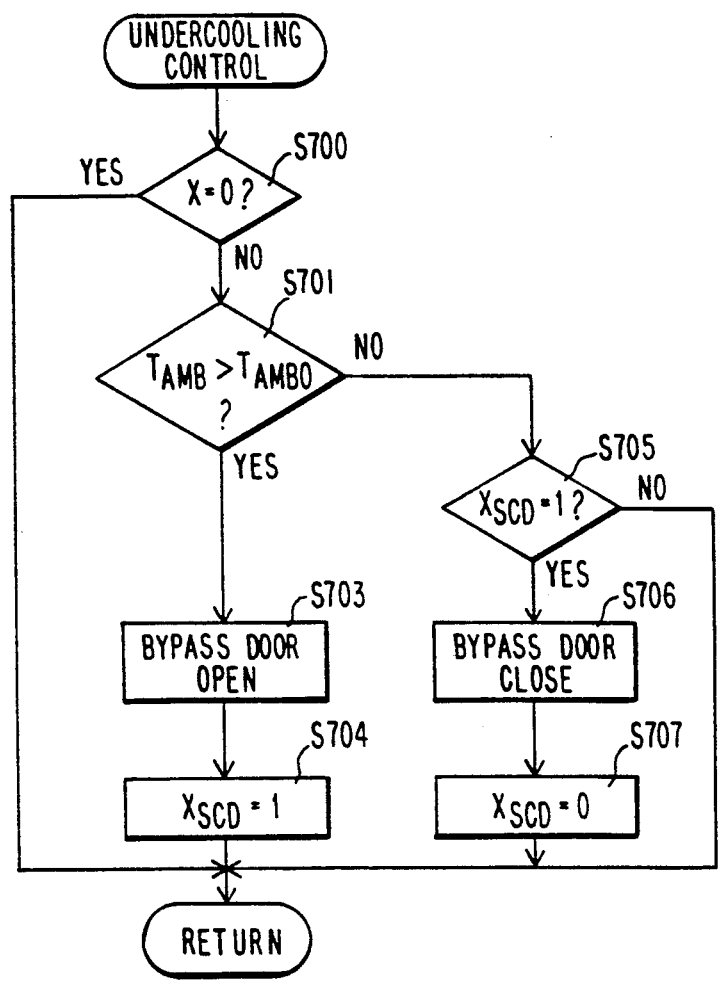
FIG. 9 is a flow chart of an undercooling control routine.

Turning now to FIG. 9, illustrated is a flow chart of an undercooling control routine.

At step S700, the CPU 41 determines whether or not the air-mix door 8 is opened. When the air-mix door is closed, no undercooling control is executed. When the step S700 is negative, step S701 is succeeded. At the step S701, the CPU 41 determines whether or not the atmospheric temperature $T_{AMB}$, which is detected by the atmospheric temperature 43, is larger than a predetermined atmospheric temperature $T_{AMB0}$, namely, $$T_{AMB} > T_{AMB0}.$$

When the step S701 is positive, this step is followed by step S703 while step S705 is succeeded when the step S701 is negative. At the step S703, the bypass door 7 is opened by using the bypass door actuator 64, thereby the cold air after being passed through the evaporator 4 is delivered into the bypass ventilation flue 5. Heat exchange is made for the delivered air by using the undercooling heat exchanger 6. In this way, the degree of undercooling of the refrigerating cycle is increased. At step S704, data $X_{SCD}=1$ is stored in a predetermined memory area, where $X_{SCD}=1$ represents that the bypass door 7 is opened. Then step S612 illustrated in FIG. 5 is carried out.

At the step S705, the CPU 41 reads out the data indicative of the current location of the bypass door 7 stored in the determined memory area to determine whether or not the bypass door is opened. When the step S705 is positive, step S706 is succeeded. On the other hand, the step S612 follows after the step S705 when the bypass door 7 is closed. At the step S706, the bypass door 7 is closed by using the bypass door actuator 64. At following step S707, data $X_{SCD}=0$ is stored in a predetermined memory area, where $X_{SCD}=0$ represents that the bypass door 7 is closed. Then step S612 is carried out.

As mentioned above, the degree of undercooling of the refrigerating cycle is increased under the circumstances of high atmospheric temperature and idle running of the engine. Therefore, the cooling capacity of the evaporator 4 is improved and the high performance of the refrigerating cycle is achieved with less fuel consumption.

Figure 10:
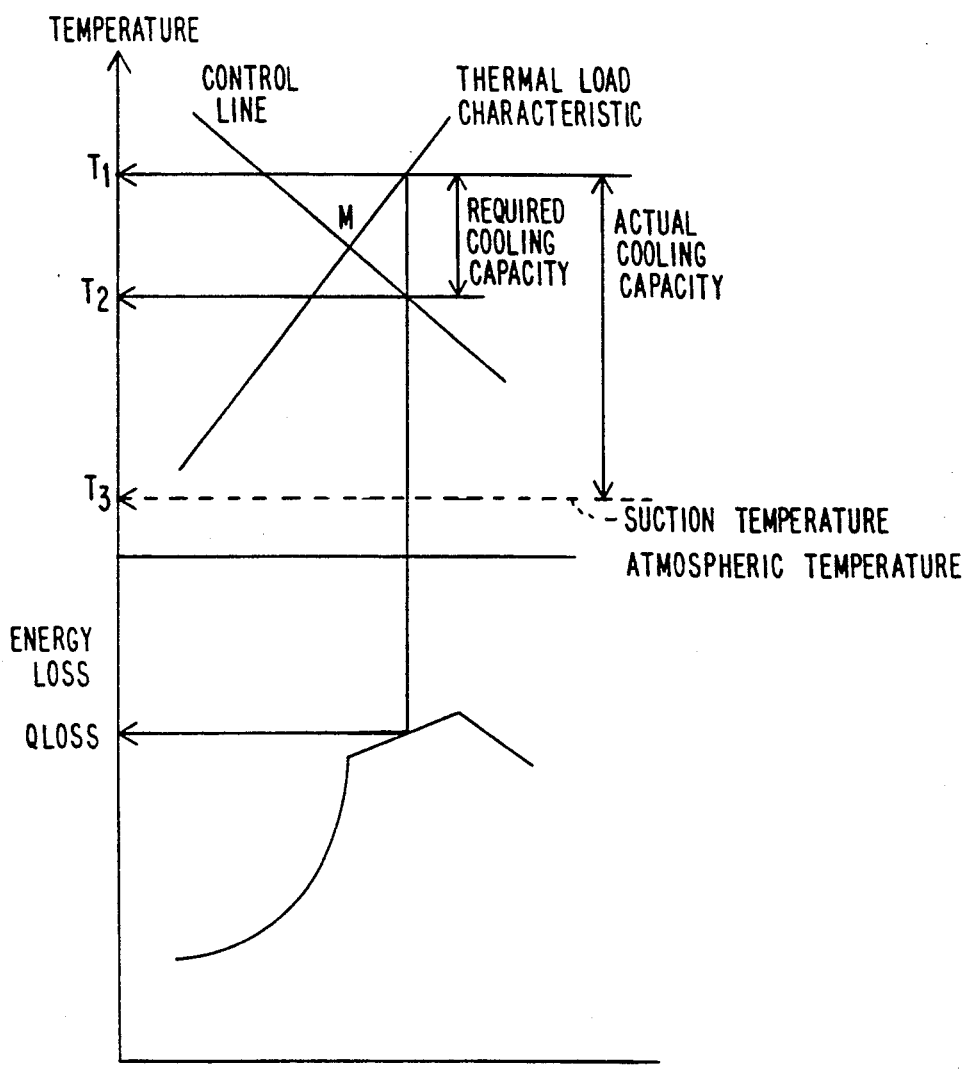
FIG. 10 is a diagrammatic view showing the relation between the thermal equilibrium characteristic and the thermal load characteristic.

FIG. 10 is a view for use in describing the relation between thermal equilibrium characteristic in a car room and thermal load characteristic. In the drawing, the thermal equilibrium characteristic is shown as a control line. It represents the characteristic of blowing air temperature which is required for equilibrating the car room temperature at a certain temperature. Also illustrated are diagrammatic views of the thermal load characteristic, intake air temperature, and energy loss. The thermal load characteristic represents that of the air to be supplied to the evaporator 4. The intake air temperature is equal to the temperature of the air delivered from the evaporator 4. The energy loss represents surplus cooling capacity of the evaporator 4.

It is noted that an intake air is cooled in the evaporator 4 and reheated by the heater core 9 in a general automatic air conditioner. In this event, the reheated air flow can be adjusted by operating the air-mix door 8, thereby the blowing air temperature is controlled. For such a usual operation of the automatic air conditioner, the blowing air temperature of the evaporator 4 is controlled to a predetermined desired temperature with respect to a critical freezing point. However, when the atmospheric temperature is higher than a crosspoint M of the control line and the thermal load characteristic line, the intake air for the evaporator 4 ($T_1$) is cooled down to the temperature represented by the control line ($T_2$) and further cooled down to the intake air temperature ($T_3$). Subsequently, the cooled air of temperature $T_3$ is reheated up to the temperature $T_2$ for the car room.

When the atmospheric temperature is lower than the crosspoint M, the intake air for the evaporator 4 is cooled down to the intake air temperature and then reheated up to the temperature represented by the control line. As a consequence, in the air conditioner according to the present invention, the energy loss due to undercooling is occurred as illustrated in FIG. 10.

Figure 11:
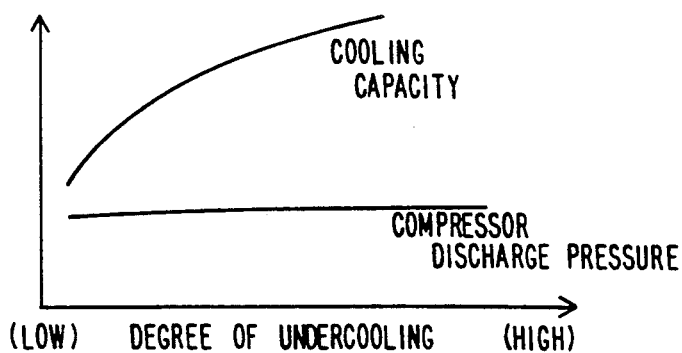
FIG. 11 is a diagrammatic view of the cooling capacity of the evaporator and the outlet pressure of the compressor.

Turning now to FIG. 11 in addition to FIG. 10. FIG. 11 is a diagram showing the cooling capacity of the evaporator 4 and the outlet pressure of the compressor 1. As illustrated in the drawing, when the degree of undercooling is increased in the refrigerating cycle operating under certain condition, the cooling capacity of the evaporator 4 is improved, in proportion to improvement of the degree of undercooling, while the outlet pressure of the compressor 1 remains almost constant.

In the preferred embodiment, the degree of undercooling of the refrigerating cycle is increased by using the heat exchanger 6 and the bypass ventilation flue 5. As mentioned above, the bypass ventilation flue 5 is located at the downstream of the evaporator 4 in the air duct 13 and the heat exchanger 6 is disposed in the bypass ventilation flue 5. The cold air send from the evaporator 4 is delivered to the bypass ventilation flue 5 and in turn to the heat exchanger 6, thereby the surplus cooling capacity is caused in the evaporator 4. The surplus cooling capacity leads the increase of the degree of undercooling, without increasing the outlet pressure of the compressor 1. Accordingly, the refrigerating cycle is more effectively operated.

To the preferred embodiment, the variable displacement compressor 1 is applied so that the compressor 1 can be controlled in order to reduce the discharge rate thereof when the intake air temperature $T_{INT}$ becomes low due to improvement of the cooling capacity of the evaporator 4. This results in a reduction of the compressor input (a horsepower required for driving the compressor). In addition, the engine speed can be controlled by using an engine speed control arrangement (not shown) in accordance with the required driving force, thereby the engine can be rotated at a lower speed. As a result, less fuel is consumed under the idle running condition.

Figure 12:
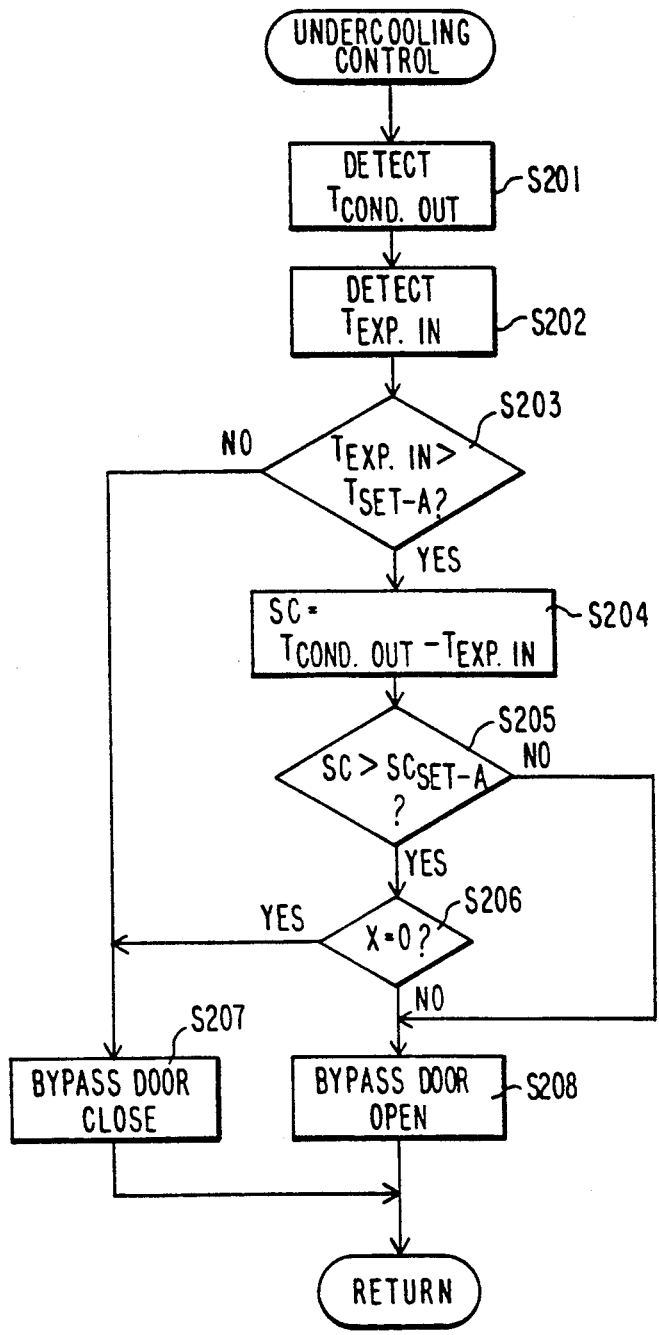
FIG. 12 is another flow chart of an undercooling control routine.

FIG. 12 shows a flow chart according to another embodiment of the present invention. In this embodiment, the control circuit 40 calculates the degree of undercooling.

At step S201, outlet refrigerant temperature of the condensor 2 (Tcond.out) is detected. At step S202, inlet refrigerant temperature of the expansion valve 3 (Texp.in) is detected.

At step S203, the CPU 41 determines whether or not the inlet refrigerant temperature of the expansion valve (Texp.in) is less than a predetermined temperature $T_{set-A}$, namely, $$\text{Texp.in} < T_{set-A}.$$

The predetermined temperature $T_{set-A}$ corresponds to the temperature where the freezing may be caused in the evaporator 4. Accordingly, when the step S203 is negative, more undercooling may cause freezing at the evaporator 4 so that step S207 is succeeded in order to close the bypass door 7. When the step S203 is positive, step S204 proceeds in order to calculate a sub-cooling rate SC.

At step S205, the CPU 41 determines whether or not the calculated sub-cooling rate SC is less than a predetermined rate $SC_{set-A}$, namely, $$SC < SC_{set-A}.$$

When the step S205 is negative, this step is followed by step S208. More specifically, when the calculated sub-cooling rate SC is less than the predetermined rate $SC_{set-A}$, the refrigerant supplied to the expansion valve is in two-phase condition with gas-liquid mixture. Under such circumstances, the proper flowing of the refrigerant may be interrupted, at the inlet of the evaporator 4, due to refrigerant steam. Therefore, the bypass door 7 for undercooling is opened at the step S208 to send the cold air to the undercooling heat exchanger 6 in order to completely liquefy the refrigerant steam before being supplied to the expansion valve 3.

When the step S205 is affirmative, step S206 is carried out. The step S206 determines whether or not the air-mix door 8 is opened by using the opening X thereof. When the air-mix door is opened, the step S208 proceeds in order to open the bypass door 7. On the contrary, when the air-mix door 8 is closed, then the step S207 follows to close the bypass door 7.

While the preferred embodiment of this invention determines freezing possibility of the evaporator 4 in accordance with the inlet temperature of the expansion valve 3, it is noted that this determination may be made in accordance with the atmospheric temperature. Consequently, this embodiment cannot only achieve the above-mentioned effects in an idle running condition or running condition, but also can achieve the similar effects by undercooling control in the condition that the degree of the undercooling in the refrigerating cycle is small.

Figure 13:
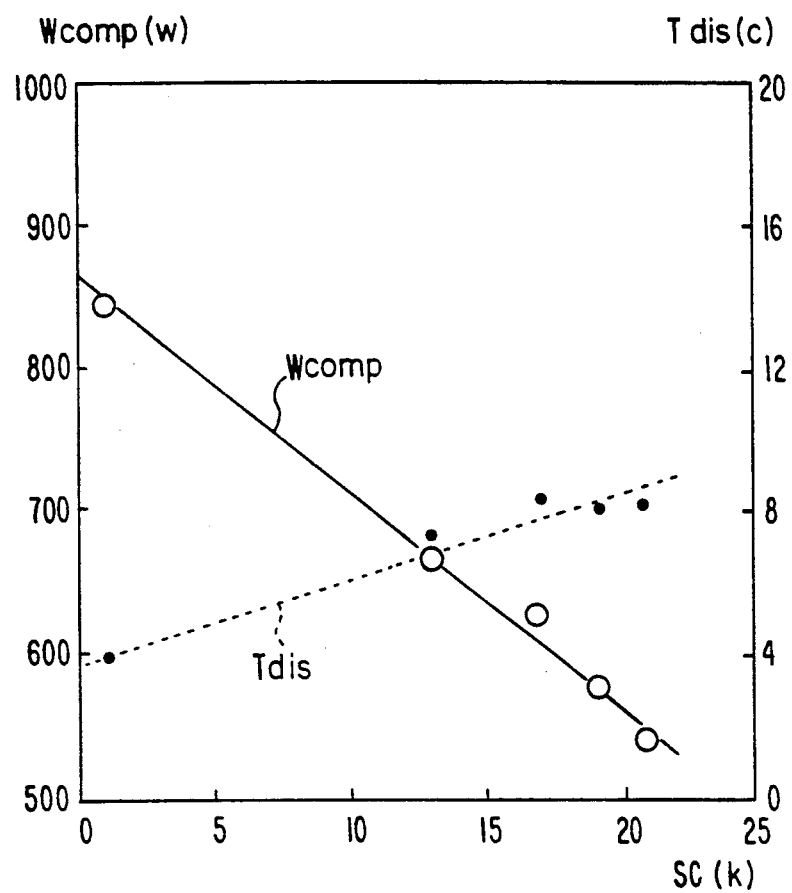
FIG. 13 is a graphical diagram showing a result of an experiment conducted in accordance with the present invention.

FIG. 13 shows a result of an experiment conducted according to the present invention. The experiment was made by using a variable displacement compressor as the compressor 1 at the atmospheric temperature of 25° C., the humidity of 40%, the condensor wind velocity of 1 m/s, and the evaporator wind capacity of 4 m³/min. In the drawing, the abscissa represents the degree of undercooling SC of the refrigerating cycle and the ordinate represents both of the compressor input (Wcomp) and the blowing air temperature at the ventilator (Tdis) with the air-mix door closed. In the exemplified experiment, only the blowing air temperature is plotted with air-mix door 8 closed. However, once applied to a vehicle, the heater core 9 continuously heat the air until the desired blowing air temperature is obtained.

As illustrated in FIG. 13, the surplus cooling capacity of the refrigerating cycle is collected by means of increasing the degree of undercooling of the refrigerating cycle. This results in improvement of the cooling capacity of the evaporator 4. In addition, the variable displacement compressor enables to reduce the discharge rate thereof so that the input for the compressor can be reduced. It is found that the blowing air temperature being rather high to the extent of not being exceeded the desired blowing air temperature.

In the example being illustrated, the undercooling control is carried out when the atmospheric temperature is higher than the predetermined temperature. However, the undercooling control may be carried out in accordance with a condensed temperature of the refrigerant in the condenser 2 and the refrigerant temperature at the inlet of the expansion valve 3.

In addition, the exemplified embodiment applies the variable displacement compressor. However, a fixed displacement compressor may be similarly applied for the same effect. More specifically, the fixed displacement compressor also enables to improve the cooling capacity of the evaporator so that the engine rotates at a lower speed even on the idle running condition.

Furthermore, the present invention may be applied for undercooling control operation when the degree of undercooling of the refrigerating cycle is relatively small.

What is claimed is:

1. An air conditioner for a vehicle comprising:
   a refrigerating cycle including a compressor compressing a gasified refrigerant into a compressed refrigerant, a condenser condensing said compressed refrigerant into a liquid refrigerant, an undercooling heat exchanger undercooling said liquid refrigerant into a cold liquid refrigerant, an expansion means for expanding said cold liquid refrigerant into an expanded refrigerant, an evaporator evaporating said expanded refrigerant, said evaporator being disposed in an air duct, said undercooling heat exchanger being disposed at the downstream of said evaporator within said air duct; and
   a control means for controlling said refrigerating cycle so as to supply to said undercooling heat exchanger with said conditioned air.

2. An air conditioner for a vehicle according to claim 1, further comprising;
   a heating means for heating a conditioned air, said heating means being arranged at a downstream of said evaporator to pass said conditioned air therethrough;
   an air-mix door used in adjusting air flow to be passed through said heating means; wherein
   said control means controlls said refrigerating cycle so as to supply to said undercooling heat exchanger with said conditioned air when said air-mix door is opened so that said conditioned air is sent to said heating means.

3. An air conditioner for a vehicle according to claim 1, wherein said control means comprises a calculating means for calculating a degree of undercooling of said refrigerating cycle in accordance with refrigerant temperature in said condenser and with that at an inlet of said expansion means; and said air conditioner further comprises an open/close control means for controlling cold air flow sent to said undercooling heat exchanger in accordance with said calculated degree of undercooling and said temperature at said inlet of said expansion means.

4. An air conditioner for a vehicle according to claim 1, wherein said control means comprises a calculating means for calculating a degree of undercooling of said refrigerating cycle in accordance with refrigerant temperature in said condenser and with that at an inlet of said expansion means; and said air conditioner further comprises an open/close control means for controlling cold air flow send to said undercooling heat exchanger in accordance with said calculated degree of undercooling and atmospheric temperature.

5. An air conditioner for a vehicle according to claim 1 wherein said undercooling heat exchanger is supplied with cold air from said evaporator by opening said open/close control means when said air-mix is opened.

* * * * *